Figure 1:
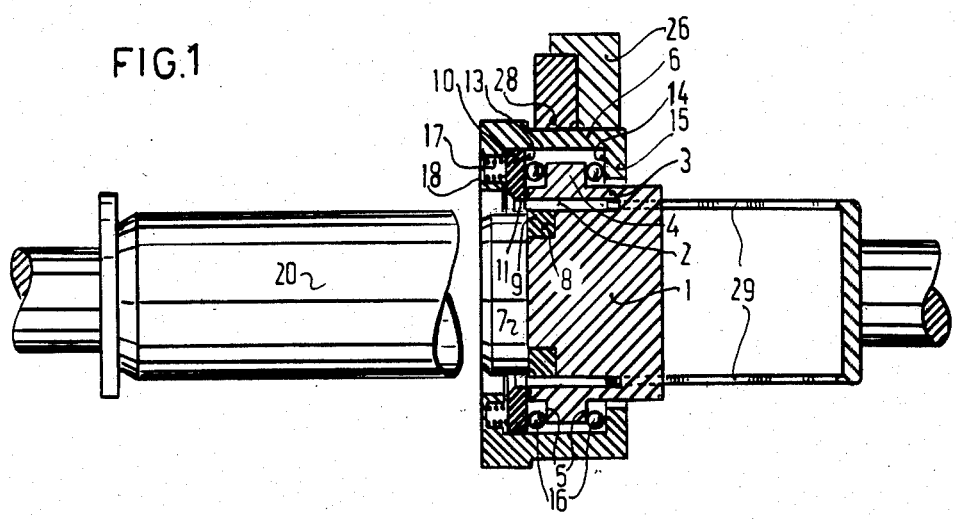

United States Patent [19]

Post

[11] Patent Number: 4,510,830
[45] Date of Patent: Apr. 16, 1985

[54] APPARATUS FOR CUTTING THROUGH OR TRIMMING A PIPE OR CAN IN A PLANE TRANSVERSE TO ITS LONGITUDINAL AXIS

[75] Inventor: Willem P. Post, Bl Diepenveen, Netherlands

[73] Assignee: Thomassen & Drijver-Verblifa N.V., Deventer, Netherlands

[21] Appl. No.: 486,715

[22] Filed: Apr. 20, 1983

[30] Foreign Application Priority Data

Apr. 27, 1982 [NL] Netherlands ............... 8201746

[51] Int. Cl.³ ............................................. B23D 21/00
[52] U.S. Cl. ........................................... 83/114; 83/54; 83/186
[58] Field of Search ............... 83/186, 185, 54, 113, 83/114; 82/58

[56] References Cited

U.S. PATENT DOCUMENTS

| | | | |
|---|---|---|---|
| 2,526,163 | 10/1950 | Shippy et al. | 164/56 |
| 2,669,302 | 2/1954 | Brehm | 83/186 |
| 3,359,841 | 12/1967 | Cvacho et al. | 82/82 |
| 3,546,987 | 12/1970 | Proctor | 82/58 |
| 3,611,853 | 10/1971 | Finsterwalder | 83/185 X |
| 3,881,380 | 5/1975 | Paramonoff | 83/186 X |

FOREIGN PATENT DOCUMENTS

| | | |
|---|---|---|
| 2548472 | 5/1977 | Fed. Rep. of Germany |
| 2298395 | 8/1976 | France |
| 1268968 | 3/1972 | United Kingdom |

Primary Examiner—Frank T. Yost
Attorney, Agent, or Firm—Diller, Ramik & Wight

[57] ABSTRACT

An apparatus for cutting through transversely or trimming pipes, pieces of tubing or cans by means of two cooperating shearing members having each a cutting edge which extends in a circular or otherwise closed line. These shearing members are mounted for relative radial wobbling shearing movement. There are provided in the apparatus also means for keeping the cooperating cutting edges at a safe axial distance from one another to avoid, during operation, damage to them, said means at the same time allowing the shearing members to relatively move in all radial directions to achieve the wobbling shearing operation.

13 Claims, 7 Drawing Figures

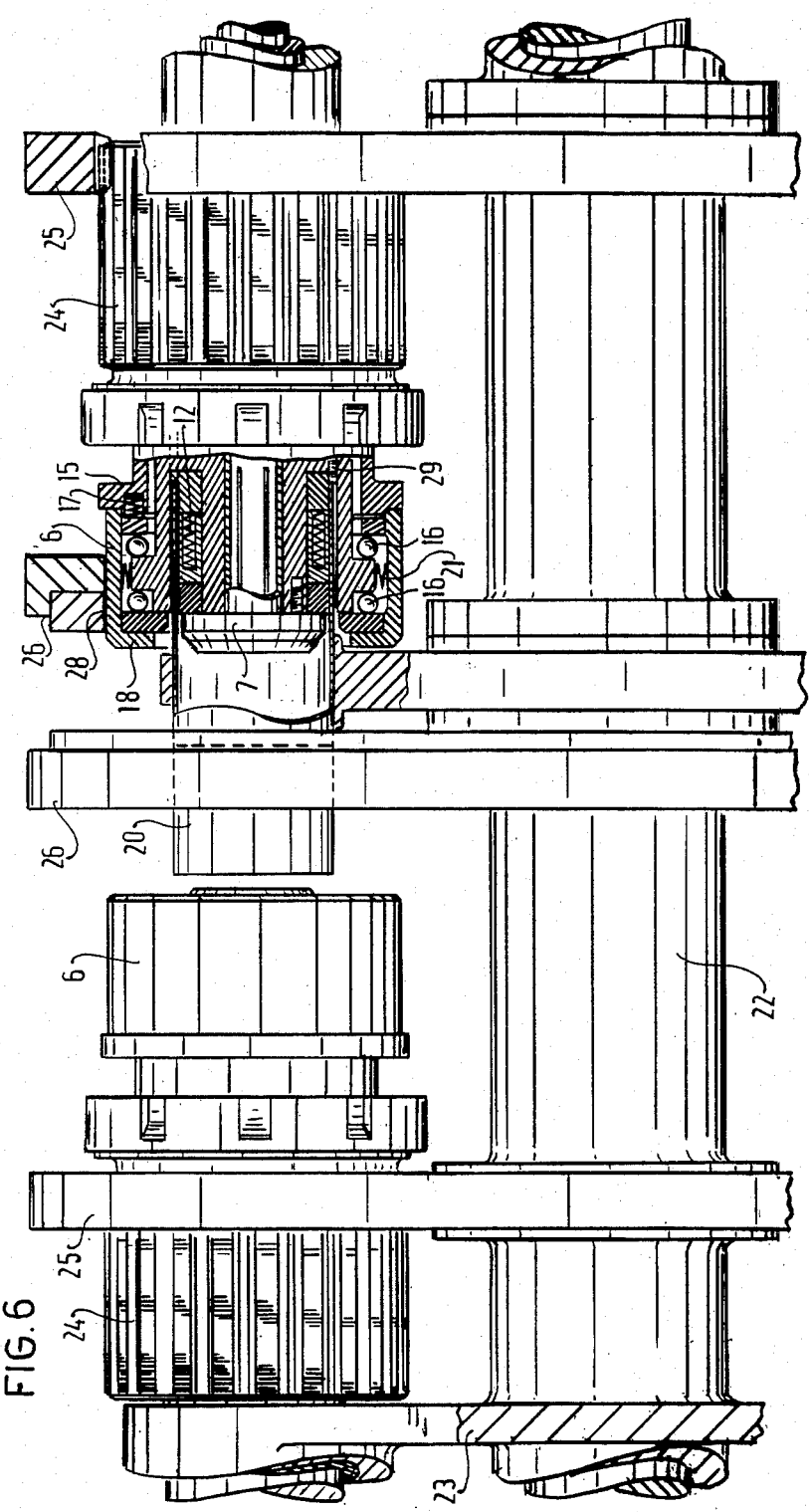

APPARATUS FOR CUTTING THROUGH OR TRIMMING A PIPE OR CAN IN A PLANE TRANSVERSE TO ITS LONGITUDINAL AXIS

The invention relates to an apparatus for cutting through or trimming a pipe or can, e.g. a welded, a soldered or a seamless deep drawn piece of tubing or a welded, a soldered or a seamless deep drawn tin, in a plane transverse to its longitudinal axis by means of two cooperating shearing members, of which the cutting edges are moved one past the other whilst enclosing together an angle.

The invention has the object to provide an apparatus which is capable of dealing continuously with great speed which pipes or cans which have to be cut through or trimmed. According to the invention this object is attained in that the first shearing member is a disc, a ring or a mandrel having extending along an edge of its outer circumference a radially outwards directed cutting edge, of which the radius of curvature in each point is at the most equal to that of a corresponding point of the inner circumference of the pipe or can to be cut through or trimmed, and the second shearing member is a ring or a bushing having extending along an edge of its inner circumference a radially inwards directed cutting edge, of which the radius of curvature in each point is at least equal to that of a corresponding point of the outer circumference of said pipe or can, whereas means are provided which during the shearing operation move the shearing members one in respect of the other successively in all radial directions in such a manner, as to ensure that the cutting edge of the second shearing member is moved or rolled in contact with a closed line lying inside the cutting edge of the first shearing member and being concentric with said cutting edge. In this apparatus the annular outer shearing member is wobbled from a position, in which its cutting edge is entirely free from the cutting edge of the inner shearing member to enable the insertion of the pipe or the can to be cut through or trimmed between the shearing members, around the inner shearing member in such a manner, as to ensure that all points of its cutting edge are successively moved radially past the cutting edge of the inner shearing member and thereby the pipe or the can is cut through in a plane transverse to its longitudinal axis.

The best results are obtained when the cutting edges of the shearing members are equal in shape to the inner circumference and the outer circumference, respectively, of the pipe or can to be cut through or trimmed. Thus shearing members having circular cutting edges and shearing members having elliptical or oval cutting edges will generally be used to trim circular pipes or cans and elliptical or oval pipes or cans, respectively. However, it will be apparent that circular, elliptical, oval or still differently shaped pipes or cans may also be cut be means of shearing members having cutting edges which are not equal in shape to the circumferences of the pipes or cans. In that case the radii of curvature of the cutting edge of the inner shearing member must be smaller than or at the most equal to the smallest radius of the inner circumference and the radii of curvature of the cutting edge of the outer shearing member must be larger than or at least equal to the largest radius of curvature of the outer circumference of the pipe or can.

Advantageously, the apparatus may be constructed in such a manner, as to ensure that the first shearing member is formed on or attached to the free end of a mandrel which is mounted for rotation about a longitudinal axis on a holder, said holder being in its turn mounted for rotation about a main axis which is parallel with the axis of rotation of the mandrel, and the second shearing member is formed on or attached to an outer bushing surrounding the mandrel and being so supported by the mandrel, as to be locked against axial movement and, if necessary, against rotation, but as to be movable, if necessary against spring force, in all radial directions in respect of the mandrel, whereas provided along the path of the mandrel around the main axis is a guideway which is adapted to control the relative radial movement of the outer bushing provided with the second shearing member and the mandrel provided with the first shearing member, said relative movement being necessary for the shearing operation. A simple construction of this apparatus is possible, if the guideway is provided on the inner circumference of a stationary annular guiding member surrounding the main axis and is concentric with said axis and the outer bushing is provided on its outer circumference with a circular guideface adapted to be brought into cooperation with the guideway, said guideface being concentric with the point lying within the arc of the cutting edge of the second shearing member and corresponding with the point of rotation of the cutting edge of the first shearing member, and if the radius of the guideway is so chosen, as to ensure that, when, in operation, the outer bushing is moved with its guideface in contact with the guideway, the cutting edge of the second shearing member is forced point after point radially towards and from the axis of rotation of the mandrel with clearance past the cutting edge of the first shearing member, and the remaining part of the inner circumference of the guiding member is so spaced from the main axis, as to allow the cutting edges of the two shearing members to move with all points of their circumferences sufficiently away from one another to let the pipe or can to be cut through or trimmed through. This apparatus is able to take up in a given place of the path of the mandrel a pipe or can to be cut through, to cut same, in a next part of said path and to discharge the pipe or can and the portion or portions cut-off in still another place.

A further improvement is achieved, when attached to and coaxially with the mandrel is a toothed wheel which is concentric with the axis of rotation of the mandrel and has a pitch circle equal to the circular guideface of the outer bushing, said toothed wheel meshing with a stationary toothed ring with interior gear which is concentric with the main axis and the pitch circle of which has a radius equal to the radius of the guideway, so that during rotation of the mandrel about the main axis the mandrel is rotated about its axis of rotation and during the shearing operation the outer bushing is rolled with its guideface in contact with the guiding member. It is then avoided that either the outer bushing with the second shearing member slidingly moves over the guideway or a relative rotation between said bushing and the mandrel occurs.

For the radially movable support of the outer bushing with the second shearing member a construction is recommended, in which formed on or attached to the mandrel is a bushing which has a collar and concentrically surrounds the mandrel with clearance to form a cylindrical gap to receive the pipe or the can to be cut through or trimmed and the collar has on each side a radial shoulder, and further in which the outer bushing has axially opposite each shoulder of the collar an inner radial shoulder and provided between each shoulder of the collar-bushing and the shoulder of the outer bushing opposite said former shoulder is a ring of balls which allow the relative movement of the outer bushing with the second shearing member and the mandrel with the first shearing member and the collar-bushing in all radial directions and keep the cutting edges of the shearing members in axial direction in the relative places required for the shearing operation. In the thus constructed apparatus an axially movable ejecting member for the removal of the trimmed pipe or can and the cut-off marginal portion thereof may be provided in the gap between the mandrel and the collar-bushing.

In order to have the supply of pipes or cans to be cut through or trimmed into the apparatus and the discharge of the cut through or trimmed pipes or cans therefrom carried out quickly the apparatus may be provided with shearing members and their accessories which are mounted for common axial movement in the stationary supporting part of the apparatus. In that case the pipes or cans may be supplied and discharged laterally in respect of the apparatus which can not only be effected quickly but also considerably reduces the axial dimension of the apparatus.

If the pipes or pieces of tubing have to be cut through or trimmed in two axially spaced apart places at the same time the apparatus may be provided with two pairs of cooperating shearing members and their accessories which are coaxially mounted one opposite the other for movement towards and from one another. Such an apparatus is important for trimming both ends of a pipe or for cutting three pieces of tubing from a long piece of tubing. Also in that case the pipes or pieces of tubing are laterally supplied and discharged.

The capacity of the apparatus is considerably increased, when the or each holder supports a plurality of parallel mandrels with shearing members, the axes of rotation of said mandrels extending in a circularly cylindrical surface which is coaxial with the main axis.

Figure 2:
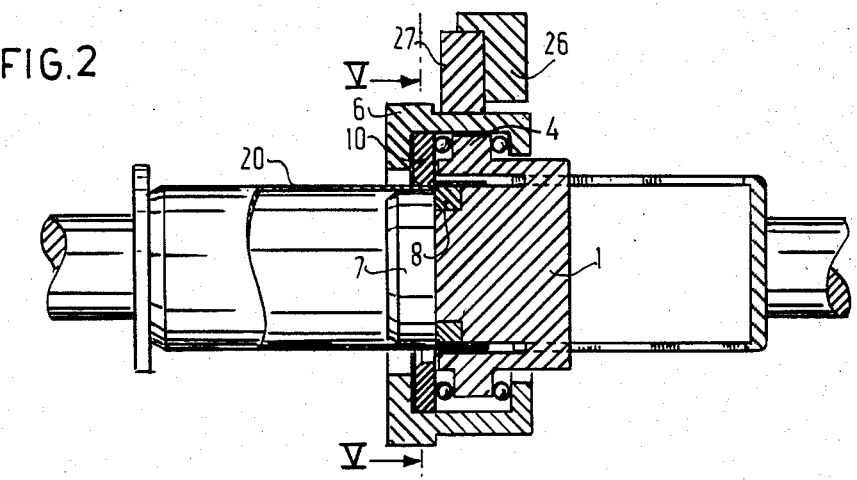
Figure 3:
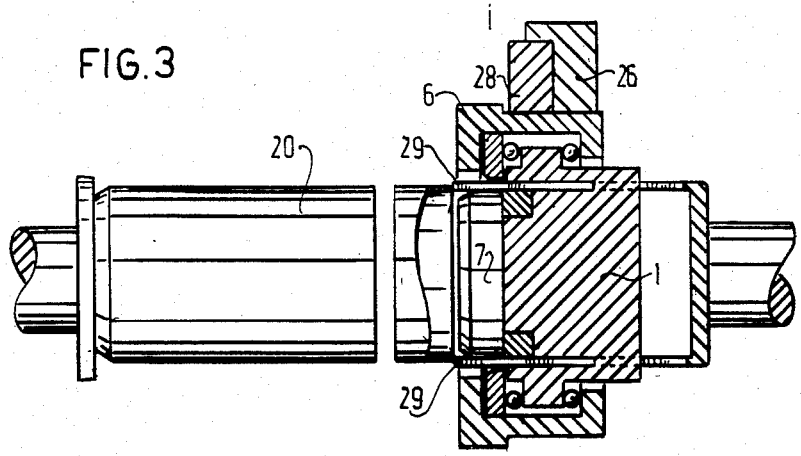
Figure 4:
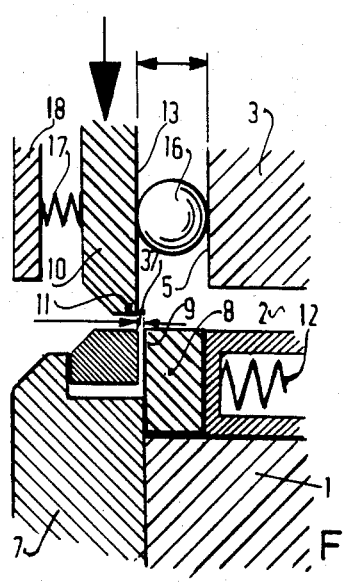
Figure 5:
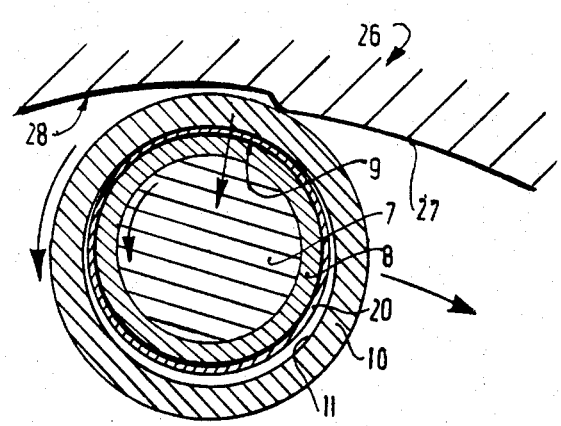

The invention will be elucidated with the aid of the drawing of an embodiment of the invention. In the drwwing:

FIGS. 1, 2 and 3 show in three different conditions an axial sectional view of the part of an apparatus constructed in accordance with the invention which is essential to understand the invention, FIG. 4 illustrates on a larger scale an axial sectional view of a detail of the apparatus shown in FIGS. 1, 2 and 3, FIG. 5 is a cross sectional view taken on line V—V of FIG. 2, FIG. 6 shows partly an axial sectional view, partly an elevational view of an apparatus provided with a plurality of pairs of coaxial mandrels with shearing members illustrated in FIGS. 1, 2 and 3, and FIG. 7 illustrates on a smaller scale a diagrammatic transverse view of a part of the apparatus shown in FIG. 6.

In all figures of the drawing 1 is a mandrel mounted for rotation about its longitudinal axis. At some distance for forming a cylindrical gap 2 the mandrel is surrounded by a bushing 3 which is provided with a collar 4 and formed on the mandrel. Said collar has on each side an exactly radial shoulder 5. The mandrel 1 with its collar-bushing 3,4,5 is surrounded by an outer bushing 6. Near its free end portion or head 7 the mandrel carries a first shearing member in the shape of a ring 8, of which the outer edge facing said head forms the cutting edge 9 of said shearing member and has a diameter which is slightly larger than that of the head 7 and is equal to that of the rest of the mandrel. The outer bushing 6 has in its cavity a second shearing member in the shape of a ring 10, of which the inner edge remote from the head 7 of the mandrel forms a cutting edge 11 adapted to be brought into cooperation with the cutting edge 9 of the ring 8 (see particularly FIGS. 4 and 5). The ring 8 is pressed against the head 7 of the mandrel 1 by springs 12 (only shown in FIGS. 4 and 6), so that the place of the cutting edge 9 is exactly defined in axial direction.

Provided between one shoulder 5 of the collar 4 of the bushing 3 and the inwardly extending side face 13 of the ring 10 and provided between the other shoulder 5 of the collar 4 and the inwardly extending side face 14 of an inner flange 15 of the outer bushing 6 are circular rows of balls 16 which allow movement of the ring 10 with its cutting edge 11 in all radial directions in respect of the mandrel 1 and the ring 8 with its cutting edge 9. However, the balls 16 provided between the ring 10 and the collar 4 also determine the correct axial position of the cutting edge 11 in respect of the cutting edge 9. They ensure that a small axial clearance, the so called cutting-gap 37, is maintained between the cutting edges 9 and 11. This cutting-gap prevents that the cutting edges come into contact with one another and thereby damage each other. Owing thereto the working life of the shearing members is considerably extended. In FIGS. 1,2,3 and 4 the ring 10 is pressed against the balls 16 by springs 17 and in FIG. 6 the ring 10 lies against an inner flange 18 of the bushing 6 and the springs 17 are provided on the other side of the collar 4 between the inner flange 15 and a ring 19 lying against the balls 16. Also these springs ensure that the ring 10 with its cutting edge 11 is pressed against the balls and is thereby held in the correct axial position in respect of the ring 8 with its cutting edge 9.

In FIGS. 1,2 and 3 a can 20 to be trimmed is moved in axial direction on the mandrel into the gap 2, as soon as the ring 10 with its cutting edge 11 has been moved by radial springs 21 (FIG. 6) into a position, in which an annular gap corresponding with the gap 2 is left between said cutting edge 11 and the cutting edge 9 of the ring 8 for letting the can through. Thereafter the ring 10 is forced by external control with its cutting edge 11 point after point in a direction towards and from the axis of the mandrel past the cutting edge 9 of the ring 8, the whilst that the mandrel and the outer bushing are rotated about the axis of the mandrel, so that the can 20 is cut through along its circumference. This movement of the ring 10 with cutting edge 11 means that said ring is moved with the centre of its cutting edge along a circle surrounding concentrically the centre of the cutting edge 9 of the ring 8.

Figure 7:
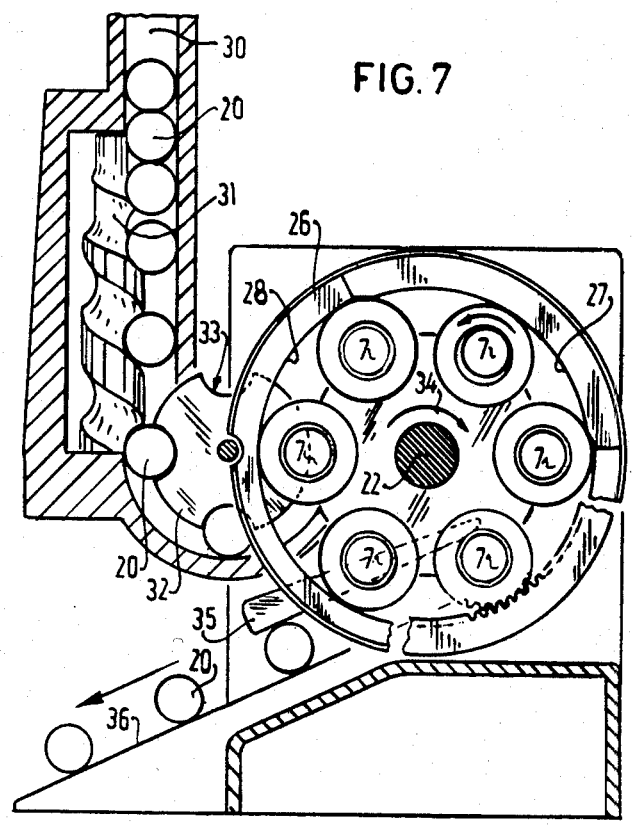

How the control of the ring 10 with cutting edge 11 is achieved in a simple way appears from FIGS. 6 and 7. In the apparatus illustrated in these figures parallel mandrels and accessories are supported with their axes extending parallel with a main shaft 22 and lying on a cylinder surface which is concentric with said main shaft by a disc-shaped holder 23 attached to the main shaft. The main shaft itself is mounted for rotation, so that the mandrels are adapted to be moved parallel to themselves in a circular path around the main shaft.

Each mandrel 1 and accessories is coaxially fastened to a toothed wheel 24 which meshes with a stationary toothed ring 25 with interior gear, so that, when the main shaft 22 with the holder 23 is rotated, the mandrels are rotated about their axes. At the same time the outer bushing 6 with the ring 10 with cutting edge 11 of each mandrel is moved along a stationary guiding member 26. The latter consists of two parts concentric with the main shaft 22, of which the active part 27 has a smaller radius and the inactive part 28 has a larger radius (see FIG. 5). If the ring 10 with cutting edge 11 moves in the inactive part 28 of the guiding member 26 it adjusts itself with its cutting edge 11 substantially concentrically with the cutting edge 9 of the ring 8, so that a gap for letting a pipe or can through is left between the two cutting edges. However, if the ring 10 comes into contact with the active part 27 of the guiding member 26, it is moved, whilst moving in contact with said part 27, with its cutting edge 11 point after point past the cutting edge 9 of the ring 8 and, consequently a pipe or can inserted into the gap 2 and extending between the rings 8 and 10 is transversely cut through.

The apparatus shown in FIG. 6 is so constructed, as to ensure that the pitch circle of the toothed wheel 24 is equal to the circumferential surface of the outer bushing 6 cooperating with the guiding member 26. Furthermore, the radius of the pitch circle of the toothed ring 25 is coaxial with and equal to the radius of the active surface 27 of the guiding member 26. The result of this construction is that, during the shearing operation, the outer bushing 6 is truly rolling in contact with the guiding member and has no tendency to rotate in respect of the mandrel.

In FIG. 6 each mandrel with accessories and its toothed wheel are mounted for axial movement on the holder 23. This makes it possible that a pipe or can is placed in lateral direction in front of a mandrel which is then axially retracted from the working position and thereupon the mandrel is inserted into the pipe or can (see the left hand side of the double apparatus shown in FIG. 6). For the ejection of the cut through or trimmed pipe or can and the cut-off portions thereof out of the gap 2 between the mandrel 1 and the collar-bushing 3,4 axially movable bars 29 are provided, which, when the mandrel is axially stationary (see FIGS. 1,2,3) are adapted to be axially inserted into the gap, but, when the mandrel itself is mounted for axial movement, may be mounted in a fixed position, since in that case they will penetrate the gap 2 as a result of the axial movement of the mandrel.

The particular feature of the apparatus shown in FIG. 6 is that it is a double apparatus, as already said, which means that provided coaxially opposite to each mandrel with accessories is a second mandrel with accessories. This apparatus is adapted, as will be obvious, to cut pipes or pieces of tubing through in two axially spaced apart places at the same time. In this way it is, for instance, possible to trim the end portions of pipes or to cut simultaneously three pieces of tubing of desired, say equal, lengths from a preshaped piece of tubing. It can only operate effectively with mandrels and accessories mounted for axial movement towards and from one another, since the pipes or pieces of tubing can only be laterally supplied to and discharged from said apparatus.

FIG. 7 illustrates diagrammatically, how the pipes or cans may be supplied one after the other through a shaft 30, by a screw conveyor 31 and by a drum 32 provided with pockets 33 laterally in front of a mandrel 1 with accessories or between two coaxial mandrels with accessories (FIG. 6) and thereafter may be rotated in a circular path about the main shaft 22 by the mandrel(s) in the direction of the arrow 34, so that they are first moved along the inactive part 28 of the guiding member 26 in order to allow the axially retracted mandrel(s) to be inserted into the respective pipe or can, thereupon moved along the active part 27 of the guiding member 26, in order to have the pipe or can cut through or trimmed in one or more places, and finally moved again along the inactive part 28 of the guiding member 26, in order to allow, after the mandrel(s) has (have) been retracted, the respected pipe portions or can portions to be discharged along the path 36 from the apparatus by means of the discharge member 35.

What we claim is:

1. Apparatus for cutting circumferentially through the wall of a tubular workpiece such as a can body, comprising an inner shearing member presenting a continuous, outwardly directed, outer peripheral cutting edge received within the workpiece and an outer shearing member presenting a continuous, inwardly directed, inner peripheral cutting edge surrounding the workpiece, and means for moving said cutting edges relative to each other substantially only in radial directions with respect to the workpiece in continuous, progressive fashion completely around the circumference of the workpiece to effect the cutting thereof.

2. Apparatus as defined in claim 1 wherein said means includes mechanism for rotating said inner shearing member and said outer shearing member in unison.

3. Apparatus as defined in claim 2 wherein said peripheral cutting edge of the inner shearing member conforms generally with the inner circumference of the workpiece.

4. Apparatus as defined in claim 3 wherein said peripheral cutting edge of the outer shearing member conforms generally with the outer circumference of the workpiece.

5. Apparatus for cutting circumferentially through the wall of a tubular member such as a can body, comprising mandrel means having a continuous, outwardly directed outer peripheral cutting edge freely received within the tubular workpiece for rotation about a predetermined axis generally concentric to the longitudinal axis of the workpiece without imparting rotation to the workpiece, an outer shearing member presenting a continuous, inwardly directed inner peripheral cutting edge surrounding the workpiece, means for axially positioning said cutting edges so as to provide a slight axial gap therebetween and for freely allowing said outer shearing member to rotate about said predetermined axis and to shift relative to said inner cutting edge in radial directions with respect to said predetermined axis, cam means for constraining the cutting edge of said outer shearing member to shift radially inwardly into overlapping relation with said cutting edge within the tubular workpiece whereby to shear through the wall of the workpiece at one location, and drive means for rotating said mandrel means and said outer shearing member in unison while said cutting edges are overlapped so as to shear progressively and continuously through said wall until the wall is severed throughout its circumference.

6. Apparatus as defined in claim 5 wherein said drive means comprises a frame rotatable about a drive axis inwardly offset from said predetermined axis and carrying said mandrel means in planetary relation thereto and gear mechanism imparting rotation to said mandrel means as the mandrel means moves in planetary orbit about said drive axis, and said cam means being centered on said drive axis and having a cam surface upon which said outer member rolls to impart rotation to said outer member in unison with rotation of said mandrel means.

7. An apparatus for cutting through a tubular member such as a cam body in a plane extending transversely of the longitudinal axis of the member by means of two cooperating shearing members, the first one of said shearing members being a disc, a ring or a mandrel having extending along an edge of its outer circumference a radially outwardly pointing self-closed cutting edge, of which the radius of curvature in each point is equal to or somewhat shorter than that in a corresponding point of the inner circumference of the pipe or can to be cut through or trimmed, so that said pipe or can fits around the first shearing member accurately or with clearance, and the second one of said shearing member being a ring or a bushing having extending along an edge of its inner circumference a radially inwardly pointing self-closed cutting edge, of which the radius of curvature in each point is equal to or somewhat longer than that in a corresponding point of the outer circumference of the pipe or can, so that said pipe or can fits in the second shearing member accurately or with clearance, and further with the aid of driving means adapted to move the ring or bushing-shaped second shearing member successively in all radial directions in respect of the first shearing member in such a manner, as to ensure that during operation the cutting edge of the second shearing member contacts successively with all its points a self-closed line extending inside and concentrically with the cutting edge of the first shearing member, the improvement wherein:

the first shearing member (8,9) is formed on or attached to a mandrel (1), which is mounted for rotation about a longitudinal axis on a holder (23);

the second shearing member (10,11) is formed on or attached to an annular or tubular member (6) supported by and surrounding the mandrel (1), said latter member (6) having an active circular peripheral guideface and being so supported, as to be locked against axial movement and, if necessary, against rotation but as to be movable, if necessary against spring force (21), in all radial directions in respect of the mandrel (1) and the first shearing member (8,9);

a guideway (27) is provided which is adapted to cooperate with the circular peripheral guideface of the annular or tubular member (6) said guideway (27) and the mandrel (1) being mounted for relative movement in a direction at right angles with the axis of rotation of the mandrel; and the driving means so rotate the mandrel and so effect said relative movement of the guideway (27) and the mandrel (1) during operation, as to force the annular or tubular member (6) with its circular peripheral guideface to roll in contact with the guideway (27) and to force thereby successively all points of the cutting edge (11) of the second shearing member (10) to move radially towards and from the axis of rotation of the mandrel (1) past the cutting edge (9) of the first shearing member (8).

8. An apparatus according to claim 7, wherein the holder (23) of the mandrel (1) is mounted for rotation about a main axis which is parallel with the axis of rotation of the mandrel;

the guide (27) is provided on and forms part of the inner circumference of a stationary annular guiding member (26) surrounding the main axis, said guideway being concentric with said axis; and the remaining part (28) of the inner circumference of the annular guiding member (26) is so spaced from the main axis, as to allow the cutting edges (9,11) of the two shearing members (8,10) to be positioned one concentrically with the other in order to leave between them a gap to receive the pipe or can (2) to be cut through or trimmed.

9. An apparatus according to claim 8 wherein a toothed wheel (24) is attached to and coaxial with the mandrel (1) and which is concentric with the axis of rotation of the mandrel, has a pitch circle equal to the circular guideface of the annular or tubular member (6) provided with the second shearing (10,11) member; and a stationary toothed ring (25) with interior gear meshing with said toothed wheel (24) is provided, said ring (25) being concentric with the main axis and having a pitch circle of which the radius is equal to that of the guideway (27), so that during rotation of the mandrel (1) about the main axis the mandrel is rotated about its own axis and during the shearing operation the annular or tubular member (6) provided with the second shearing member (10,11) is rolled with its guideface in contact with the guideway (27) of the guiding member (26).

10. An apparatus according to claim 9 wherein a bushing (3) is formed on or attached to the mandrel (1) and which has a collar (4) and concentrically surrounds the mandrel with clearance to form a gap (2) adapted to receive the pipe or the cam (20) to be cut through or trimmed, said collar (4) having on each side a radial shoulder (5);

the annular or tubular member (6) provided with the second shearing member (10,11) has axially opposite each shoulder (5) of said collar (4) a radially inwards directed shoulder (13,14); and provided between each shoulder (5) of the collar (4) and the axially opposite shoulder (13,140 of said annular or tubular member (6) is a ring of balls (16) which allow the relative movement of the two shearing members (8,9; 10,11) in a plane perpendicular to the longitudinal axis of the mandrel (1) but keep the shearing members with their cutting edges (9,11) in axial direction in the relative places required for the shearing operation.

11. An apparatus according to claim 10 wherein in the gap (2) between the mandrel (1) and the collar bushing (3) is an axially movable ejecting member (29) for the removal of the trimmed pipe or can (2) and the cut-off marginal portion thereof.

12. An apparatus according to claim 8 wherein a bushing (3) is formed on or attached to the mandrel (1) and which has a collar (4) and concentrically surrounds the mandrel with clearance to form a gap (2) adapted to receive the pipe or the can (2) to be cut through or trimmed, said collar (4) having on each side a radial shoulder (5);

the annular or tubular member (6) provided with the second shearing member (10,11) has axialy opposite each shoulder (5) of said collar (4) a radially inwards directed shoulder (13,14); and provided between each shoulder (5) of the collar (4) and the axially opposite should (13,14) of said annular or tubular member (6) is a ring of balls (16) which allow the relative movement of the two shearing members (8, 9;10,11) in a plane perpendicular to the longitudinal axis of the mandrel (1) but keep the shearing members with their cutting edges (9, 11) in axial direction in the relative places required for the shearing operation.

13. An apparatus according to claim 12 wherein in the gap (2) between the mandrel (1) and the collar bushing (3) is an axially movable ejecting member (29) for the removal of the trimmed pipe or can (20) and the cut-off marginal portion thereof.

* * * * *